(12) United States Patent
Stewart et al.

(10) Patent No.: US 7,448,338 B2
(45) Date of Patent: Nov. 11, 2008

(54) FLEXIBLE SUPPORT FOR DOCK FENDER

(75) Inventors: Robert E. Stewart, Union, MI (US); Daniel F. Stanek, Lincolnshire, IL (US)

(73) Assignee: Buoyant Solutions, Inc., Sturgis, MI (US)

( * ) Notice: Subject to any disclaimer, the term of this patent is extended or adjusted under 35 U.S.C. 154(b) by 0 days.

(21) Appl. No.: 11/504,453

(22) Filed: Aug. 15, 2006

(65) Prior Publication Data
US 2008/0041290 A1  Feb. 21, 2008

(51) Int. Cl.
*B63B 59/02* (2006.01)
(52) U.S. Cl. .................................... 114/219
(58) Field of Classification Search ........... 114/219
See application file for complete search history.

(56) References Cited

U.S. PATENT DOCUMENTS

| 3,339,907 | A |   | 9/1967  | Parker |
|-----------|---|---|---------|--------|
| 4,641,999 | A |   | 2/1987  | Korbuly |
| 4,756,266 | A |   | 7/1988  | Sakuraoka |
| 4,773,348 | A | * | 9/1988  | Rowley ................. 114/219 |
| 5,361,716 | A | * | 11/1994 | Cotton ............. 114/230.11 |
| 5,429,063 | A |   | 7/1995  | Rosenkranz |
| 5,671,692 | A |   | 9/1997  | Kimball |
| 6,112,690 | A | * | 9/2000  | Anderson ............... 114/220 |
| 6,513,449 | B1|   | 2/2003  | Stewart et al. |

* cited by examiner

*Primary Examiner*—Stephen Avila
(74) *Attorney, Agent, or Firm*—Flynn, Thiel, Boutell & Tanis, P.C.

(57) ABSTRACT

A dock fender support bracket includes a cup-like holder section having a sidewall and a bottom wall and a pair of axially aligned holes through the sidewall. In one embodiment, the support bracket includes a clevis section having a body with spaced flanges oriented inside of the cup-like holder section and extending in parallel planes. In another embodiment, the support bracket is integrally molded. An elongate section of the support bracket is configured to be attached to a dock and to elastically flex in all directions transverse of a longitudinal axis thereof. The elongate section can be formed of a hollow or solid resin, and can include spring or metal reinforcement. The support bracket is configured to support the dock fender at the cup-like holder section. A resilient insert can support a rod-mounted fender.

24 Claims, 22 Drawing Sheets

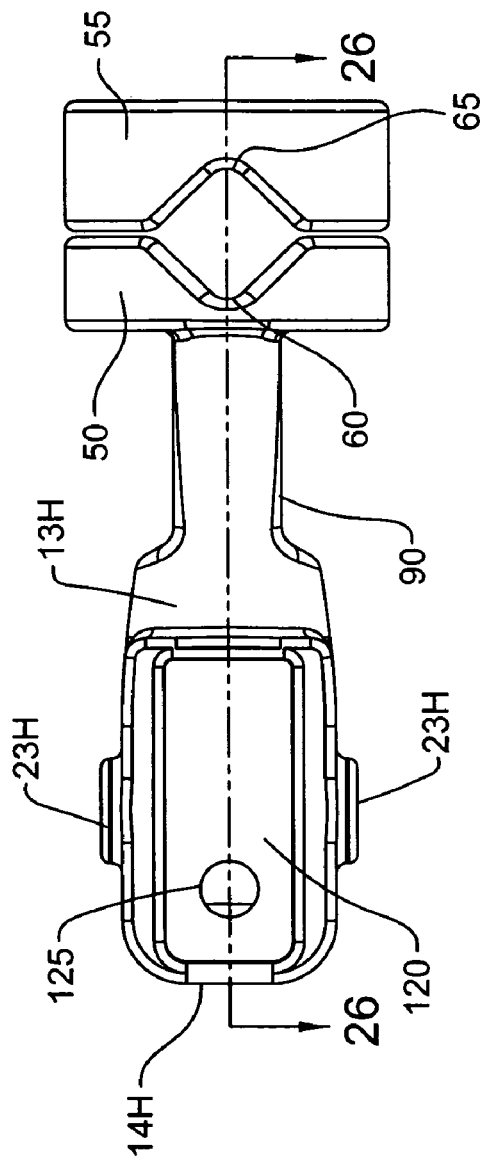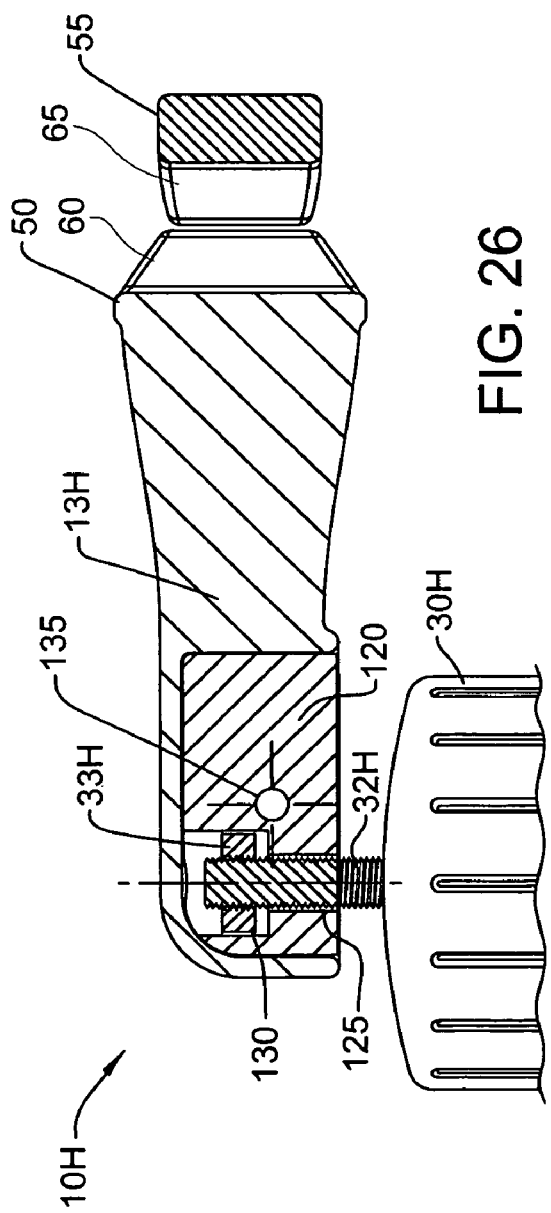

FLEXIBLE SUPPORT FOR DOCK FENDER

FIELD OF THE INVENTION

This invention relates to a marine docking device and, more particularly, to a marine dock fender support bracket configured to couple to a flange of a dock fender that is non-rotational.

BACKGROUND OF THE INVENTION

A variety of solutions have been proposed to prevent damage to boats that are landing or secured to a dock. Many of these solutions include metal components which can come into contact with the hull of the boat during docking or when it is secured to the dock. This deficiency with existing solutions is serious and there is a desire for improved dock fender support brackets.

Accordingly, it is an object of the invention to provide a dock fender support bracket which is configured to couple to a flange of a dock fender to non-rotationally support same thereon.

It is a further object of the invention to provide a dock fender support bracket, as aforesaid, which is composed of materials adequately protected by the dock fender support bracket configuration to prevent contact of any metal thereon with the hull surface during docking or while the boat is secured to a dock.

A further object of the invention is to provide a dock fender support bracket, as aforesaid, wherein a majority of the components thereof are made of a synthetic resin material, such as rubber.

SUMMARY OF THE INVENTION

The objects and purposes of the invention are met by providing a dock fender support bracket that is configured to couple to a flange of a dock fender having a first hole therethrough, the flange being received inside of a cup-like holder section having a sidewall and a bottom wall and a pair of axially aligned holes through the sidewall. The support bracket includes a clevis section having a body with spaced flanges oriented inside of the cup-like holder section and extending in parallel planes. A third hole through each of the spaced flanges is provided and these holes are coaxially aligned with the holes in the sidewall of the cup-like holder section. An elongate rod section is joined to the body of the clevis. The elongate rod is configured to be attached to a dock at an end remote from the body and additionally configured to elastically flex in all directions transverse of a longitudinal axis thereof when the end is attached to the dock. The clevis section is configured to receive the flange of the dock fender between the spaced flanges so that an axis of the first hole becomes generally coaxially aligned with the coaxial holes in the wall of the cup-like holder section and the clevis section so as to facilitate the reception of a fastener therethrough as well as through the first hole to effect coupling of the dock fender to the dock fender support bracket.

BRIEF DESCRIPTION OF THE DRAWINGS

Other objects and purposes of this invention will be apparent to persons acquainted with dock fender support brackets upon reading the following specification and inspecting the accompanying drawings, in which:

FIG. 25 is a top view of the dock fender support of FIG. 24;

FIG. 26 is a sectional view of the dock fender support of FIG. 25; and

DETAILED DESCRIPTION

Figure 1:
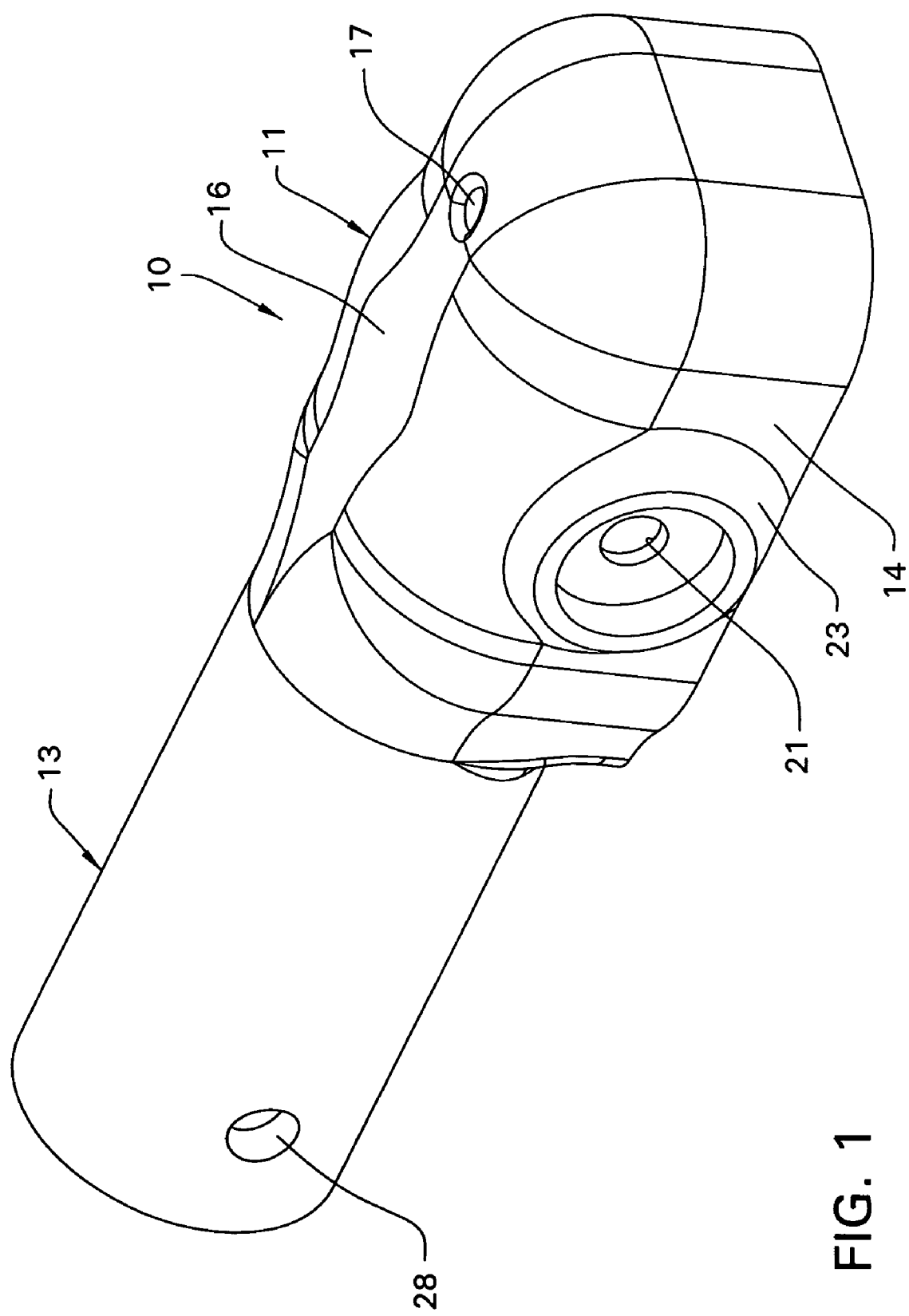
FIG. 1 is a front side, top and right end isometric view of a first embodiment of a dock fender support bracket embodying the invention.

Certain terminology will be used in the following description for convenience in reference only and will not be limiting. The words "up", "down", "right" and "left" will designate directions in the drawings to which reference is made. The words "in" and "out" will refer to directions toward and away from, respectively, the geometric center of the device and designated parts thereof. Such terminology will include derivatives and words of similar import.

The invention described herein represents the furtherance of the development work corresponding to the dock fender support illustrated in U.S. Pat. No. 6,513,449, issued on Feb. 4, 2003. This patent is owned by the same Assignee that owns this invention. Accordingly, the subject matter of U.S. Pat. No. 6,513,449 is to be incorporated herein by reference.

As is illustrated in FIG. 1 of the aforesaid U.S. Pat. No. 6,513,449, brackets are provided on support posts of a dock to which is secured componentry for supporting a dock fender. The brackets disclosed therein and which are attached to the dock configuration are the same components to which the dock fender support bracket invention disclosed herein are to be attached.

Referring to FIGS. 1-5, a dock fender support bracket 10 embodying the invention includes a cup-like holder section 11, a clevis section 12 (FIGS. 2, 4 and 5) and an elongate rod section 13. In this particular embodiment, the dock fender support bracket 10 is of a unitary construction and is made of a synthetic resin material, namely, a rubber having a Durometer hardness value ranging between a Shore A of 90 and a Shore D of 60.

Figure 2:
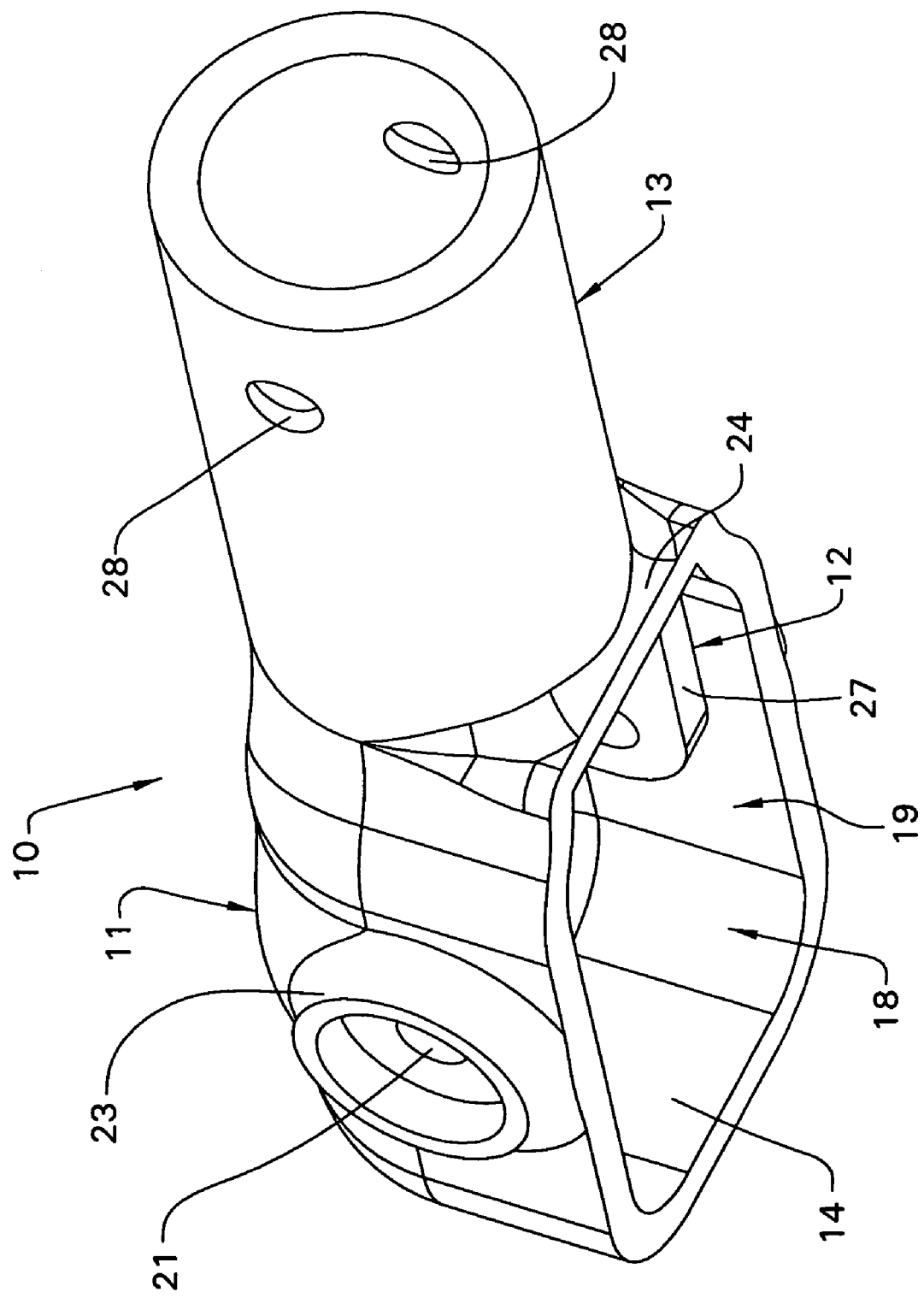
FIG. 2 is a bottom, rear side and left end isometric view of the dock fender support bracket illustrated in FIG. 1.
Figure 3:
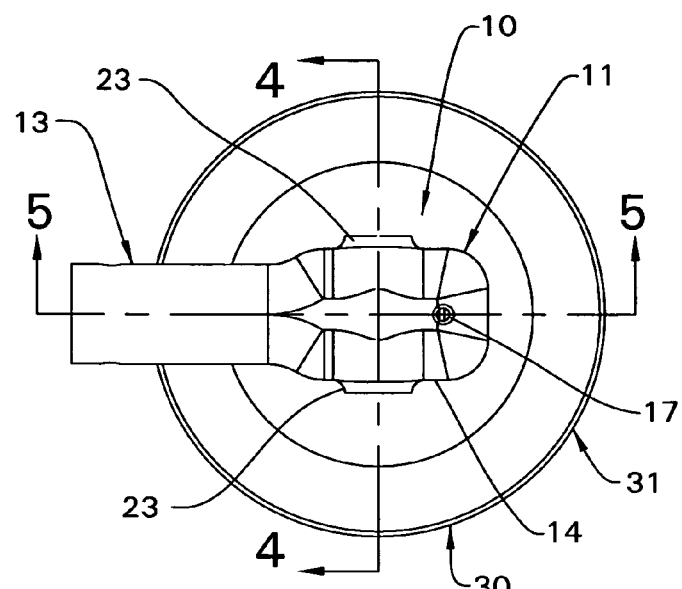
FIG. 3 is a top view of the dock fender support bracket illustrated in FIGS. 1 and 2.
Figures 4, 5:
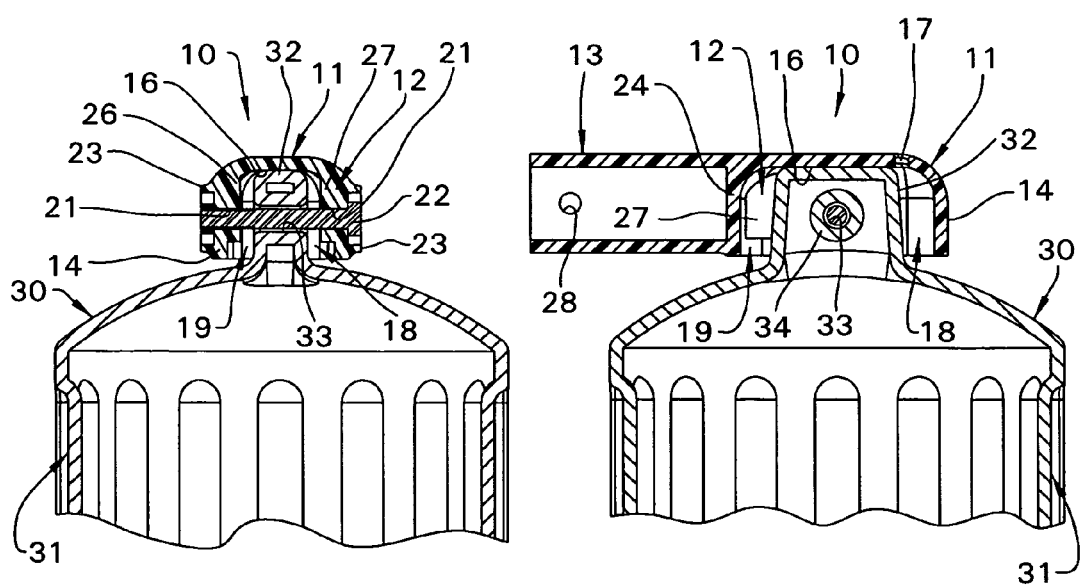
FIG. 4 is a sectional view taken along the line 4-4 of FIG. 3.
FIG. 5 is a sectional view taken along the line 5-5 of FIG. 3.

The cup-like holder or, more specifically, a cup shaped holder section 11 as shown on FIGS. 1 and 2 includes a sidewall 14 and a bottom wall 16, the bottom wall 16 actually being the top wall in the illustration of FIG. 1. The bottom wall 16 has a through hole 17 to facilitate the exit of liquid collected on the inside or in the cupped cavity 18 of the cup shaped holder section 11 when an opening 19 into the interior or cupped cavity 18 of the cup is upwardly facing. The sidewall 14 includes a pair of diametrically opposed holes 21 that are coaxial with respect to one another and are configured to receive a fastener device 22, such as a nut and bolt, therethrough as illustrated in FIGS. 4 and 5. In order to recess the heads of the nut and the bolt, the material of the sidewall 14 is embossed as at 23 around the outside opening region of each hole 21 as illustrated in FIGS. 1 and 2.

The dock fender support bracket 10 includes, as aforesaid, a clevis section 12 which, in this particular embodiment, is integral with the inside surface of the cup shaped holder section 11. The clevis includes a body part 24 (FIG. 5) and a pair of laterally spaced flanges, here wall thickenings 26 and 27 that effectively increase the wall thickness of the sidewall 14 immediately adjacent each of the coaxial openings 21.

The elongate rod section 13 is hollow as illustrated in FIG. 5 with one end thereof being integrally attached to the body part 24 and the sidewall 14 of the cup shaped holder section 11. A pair of holes that are coaxial with each other are provided through the wall of the elongate rod section 13 adjacent an end thereof remote from the body part 24. The holes 28 are configured to receive a fastener element therethrough to facilitate a coupling of, the elongate rod section 13 to a bracket component that is mounted on the dock as illustrated in FIG. 1 of the aforesaid U.S. Pat. No. 6,513,449.

A conventional dock fender 30 includes a cylindrical elastically yieldable body 31 which has at opposite ends thereof a protruding flange configuration 32 having a hole 33 therethrough. In this particular embodiment, the dock fender 30 is of a blow molded configuration so that the hole 33 is surrounded by material 34 as illustrated in FIG. 5. The hole 33 is configured to be aligned with the holes 21 in the sidewall 14 of the cup shaped holder section 11 so as to facilitate the reception therethrough of the aforesaid fastener device 22 and to effect a coupling of the dock fender 30 to the dock fender support bracket 10.

Figure 6:
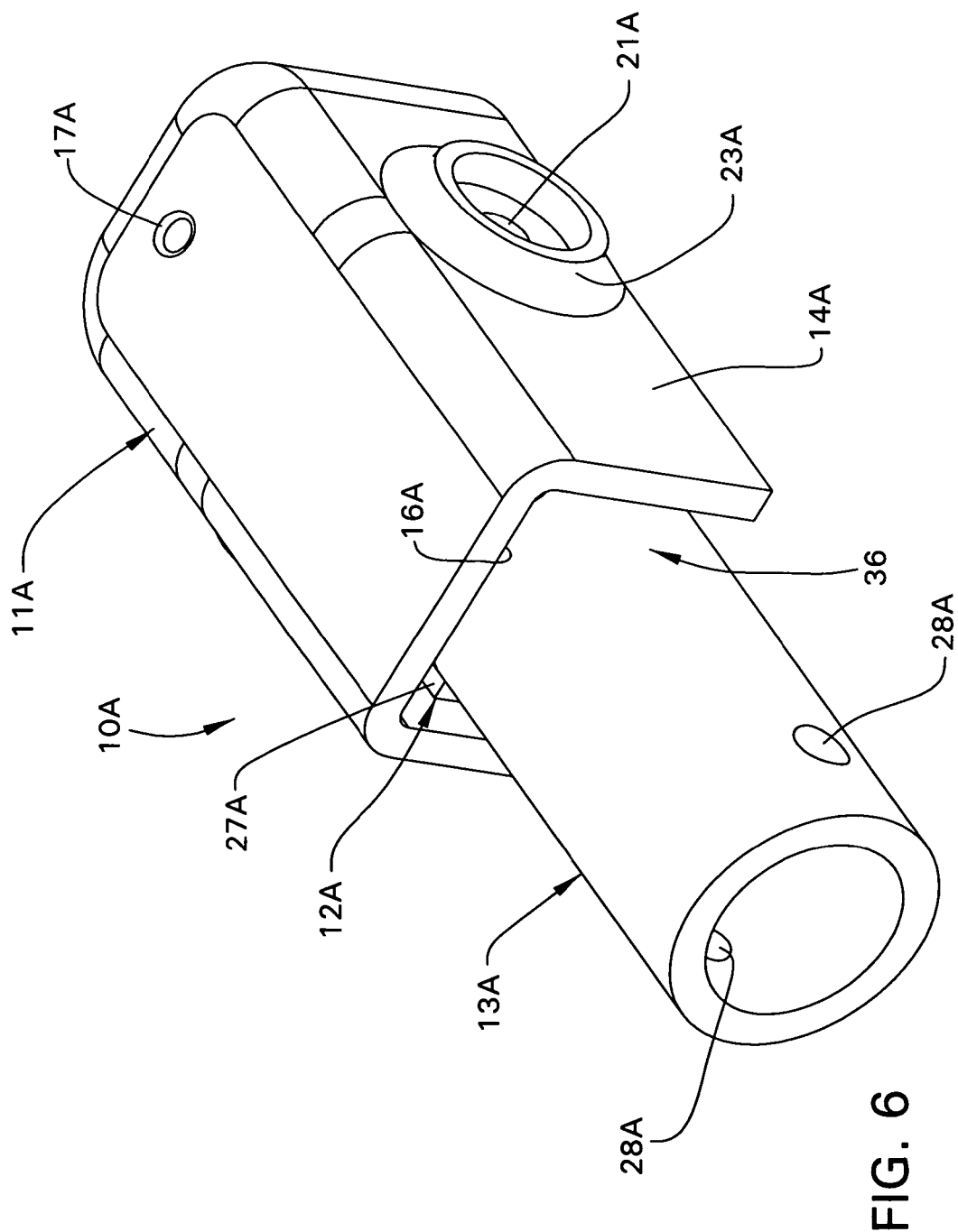
FIG. 6 is a front side, top and left end isometric view of a second embodiment of a dock fender support bracket embodying the invention.
Figure 7:
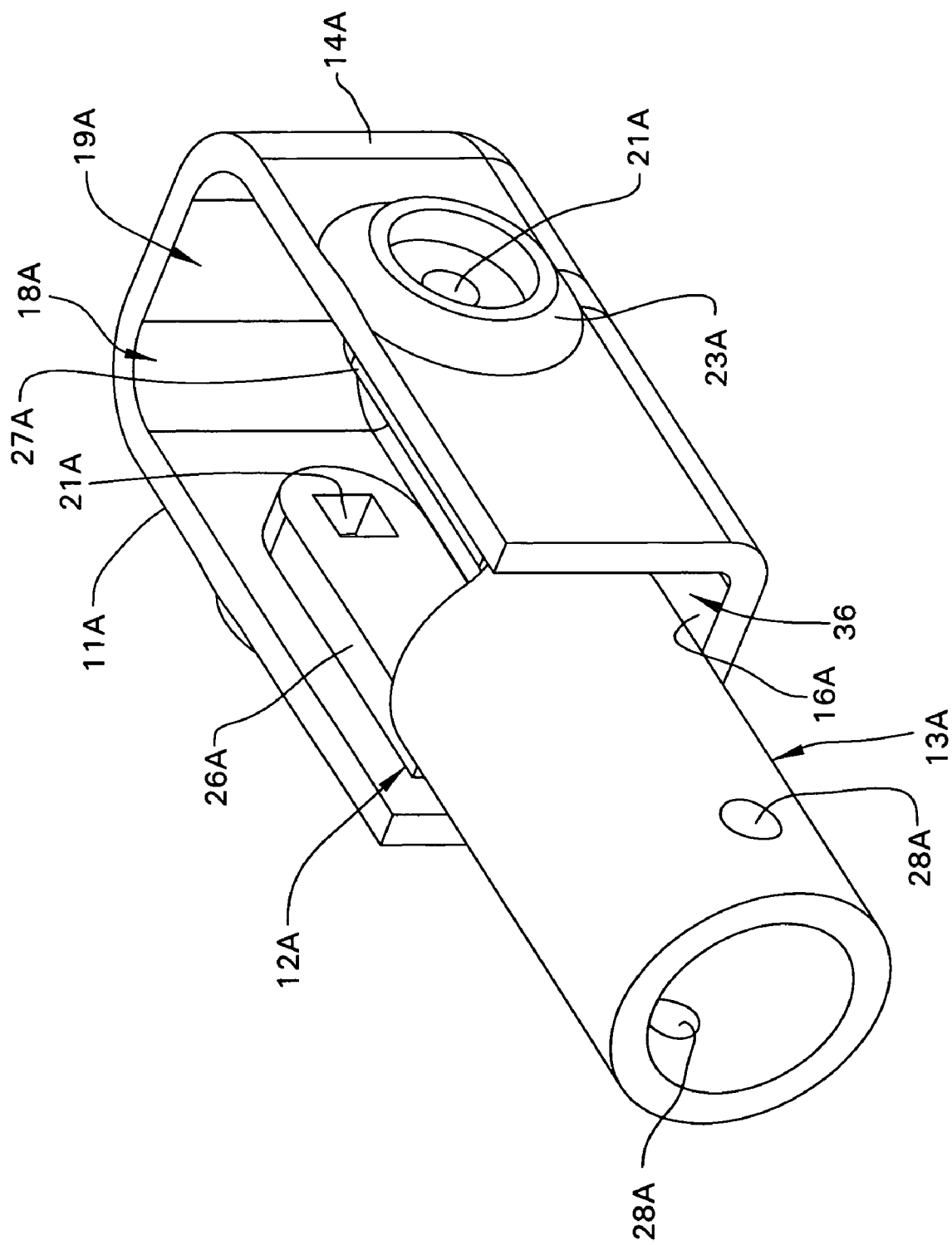
FIG. 7 is a bottom, rear side and left end isometric view of FIG. 6.
Figure 8:
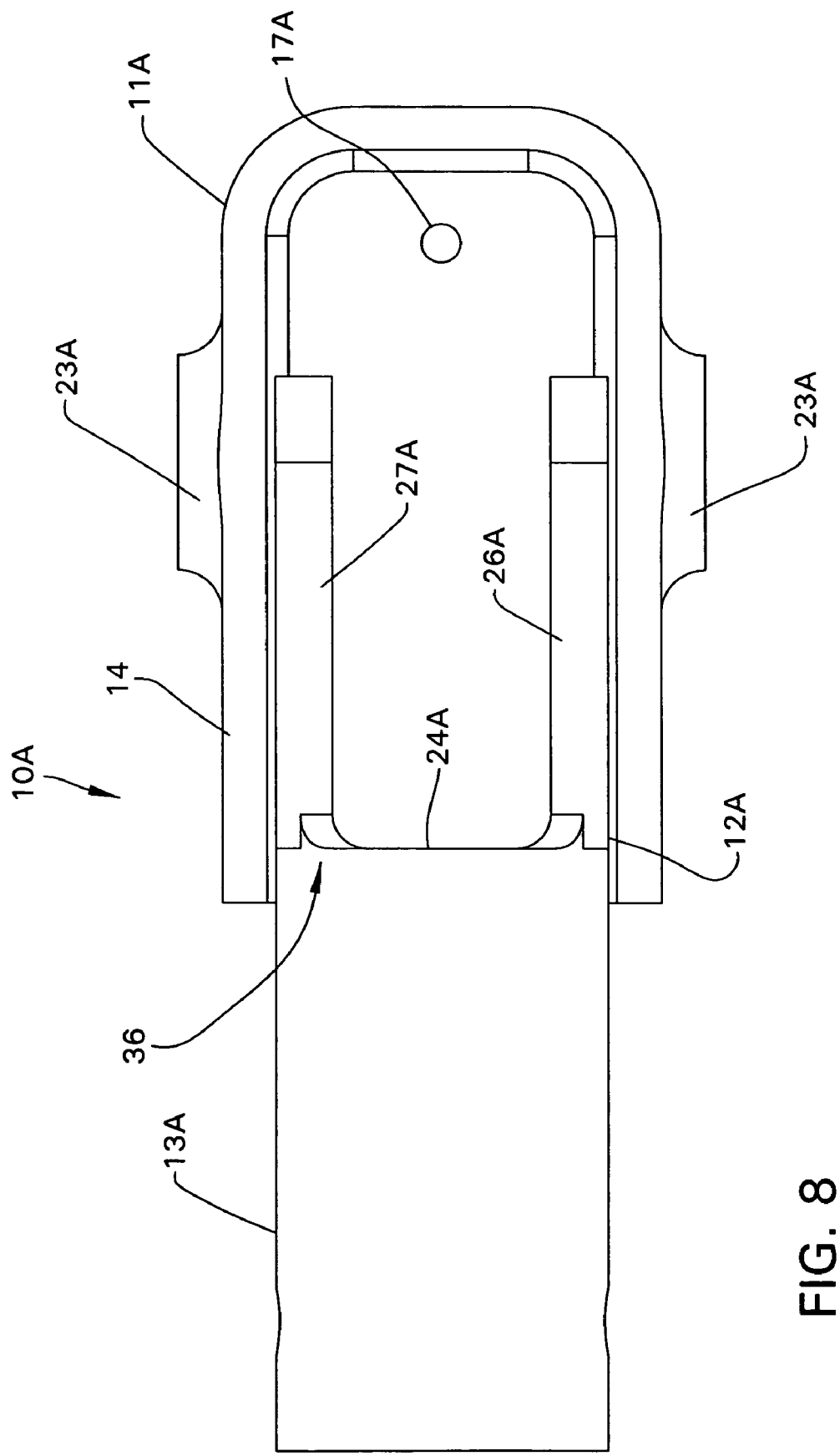
FIG. 8 is a bottom view of FIGS. 6 and 7.

FIGS. 6-8 illustrate an alternate construction of a dock fender support bracket 10A. The reference numerals that will be used to describe the alternate embodiment 10A will be the same as was used above in describing the construction of FIGS. 1-5, except that the suffix "A" will be added thereto.

Just like the dock fender support bracket 10, the alternate construction of the dock fender support bracket 10A also includes a cup shaped holder section 11A, a clevis section 12A and an elongate rod section 13A. The cup shaped holder section 11A includes a sidewall 14A and a bottom wall 16A. In this particular embodiment, the cup shaped holder section 11 is a separate component from the clevis section 12 and the elongate rod section 13. As a result, the wall 14A of the cup shaped holder section 11A is open as at 36 to facilitate the reception therein of the clevis section 12A and elongate rod 13A.

The clevis section 12A and the elongate rod 13A are integrally connected. The clevis section 12A includes a body part corresponding to the body part 24 illustrated in FIG. 5 with the flanges 26A and 27A extending parallel therefrom as illustrated in FIGS. 7 and 8. While the cup shaped holder section 11 and the unitary elongate rod section 13A and clevis section 12A are separate components from one another, they are, in this particular embodiment, made of the same synthetic resin material, namely, a rubber having a Durometer hardness value ranging between a Shore A of 90 and a Shore D of 60. If desired, each flange 26, 26A or 27, 27A can have a differently configured hole 21 extending therethrough. As is illustrated in FIG. 7, the hole 21 on one side of the sidewall 14, 14A can be circular whereas the other hole 21 diametrically opposed thereto can be of a square configuration. Thus, fastener devices having square configurations can be received through the axially aligned holes in the flange of the dock fender 30 and through the flanges of the clevis section 12 and the wall 14 of the cup shaped holder section 11 to facilitate tightening of a nut thereto without causing rotation of the square shaped bolt section.

Figure 9:
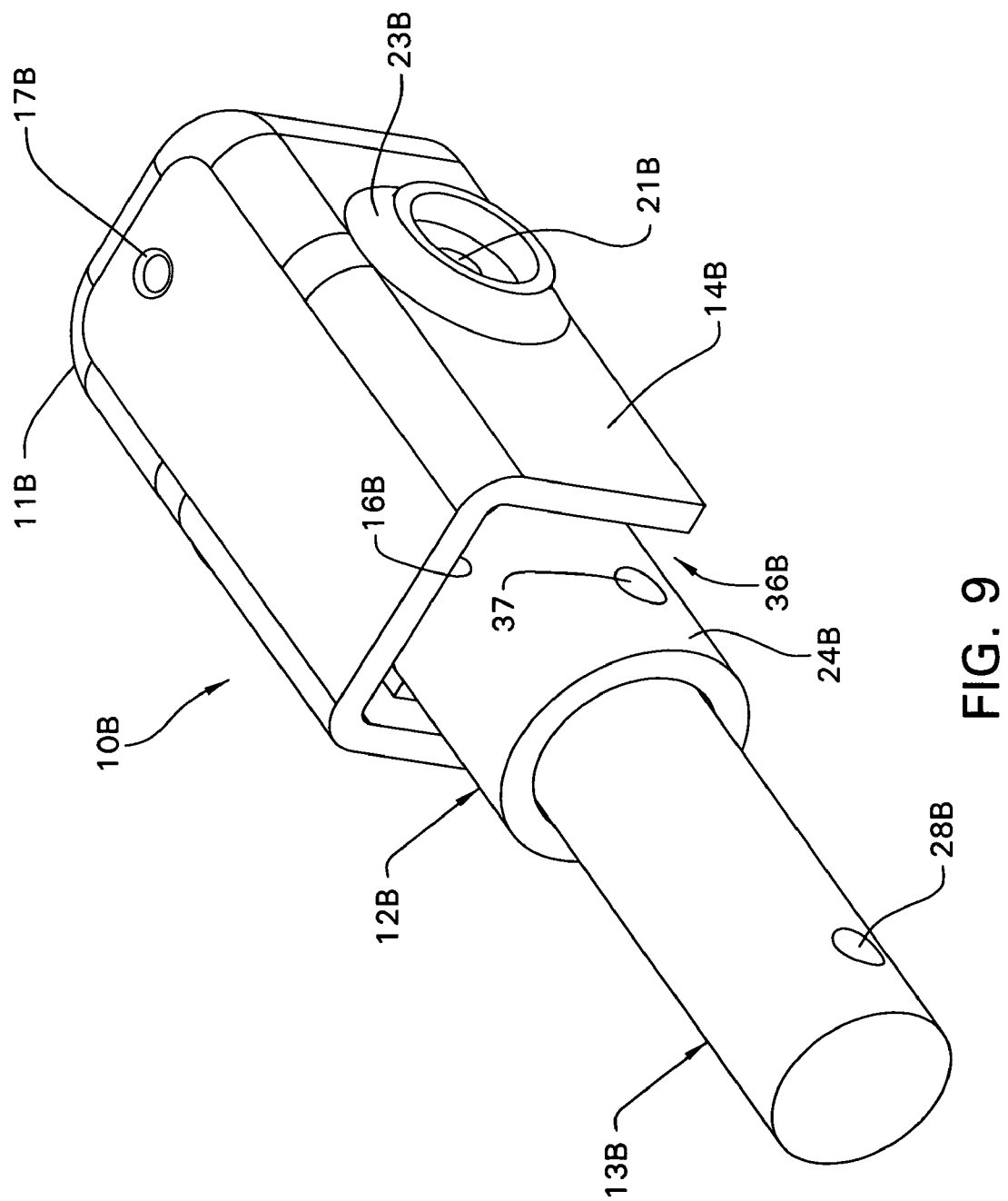
FIG. 9 is a front side, top and left end isometric view of a third embodiment of a dock fender support bracket embodying the invention.
Figure 10:
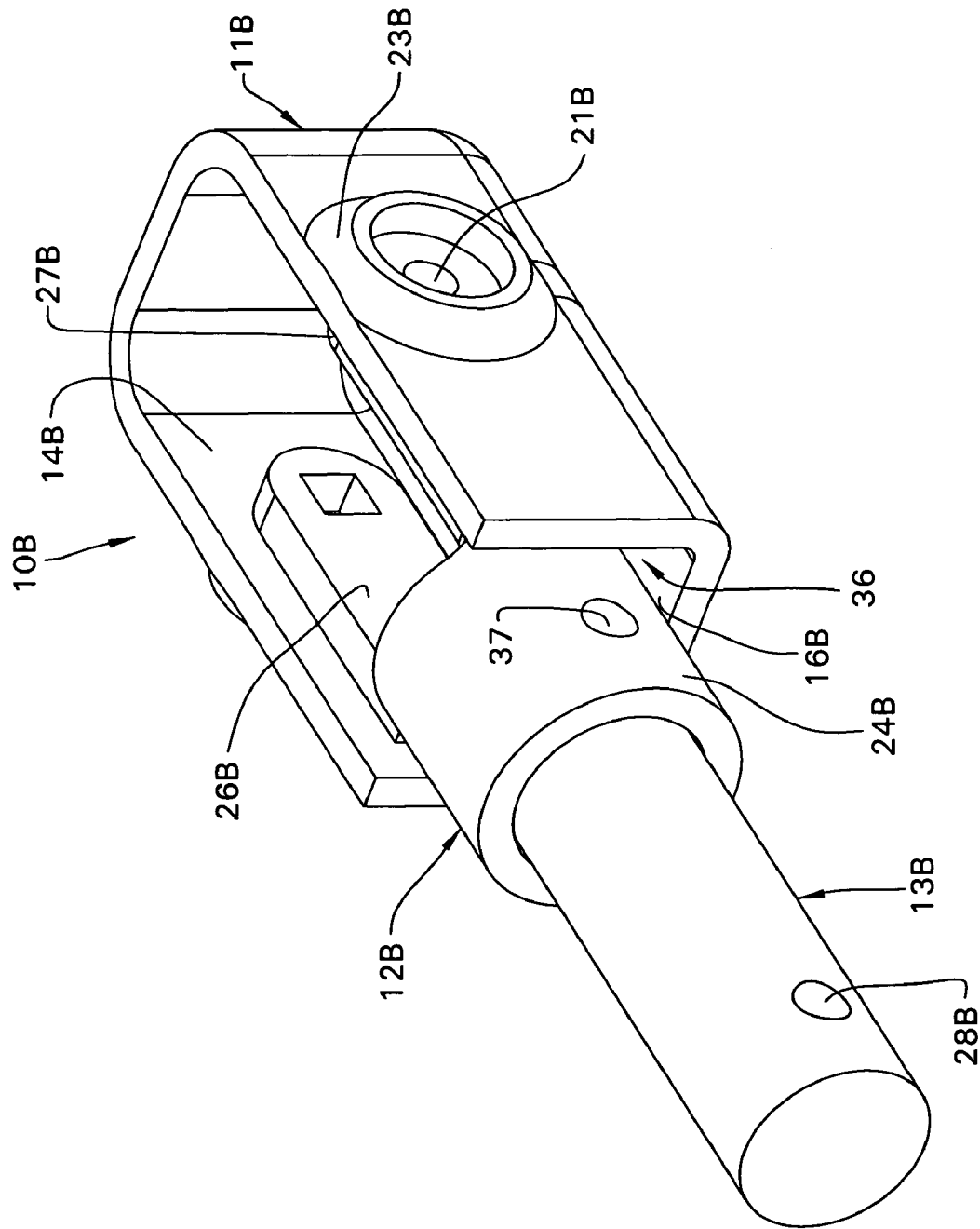
FIG. 10 is a bottom, rear side and left end isometric view of FIG. 9.
Figure 11:
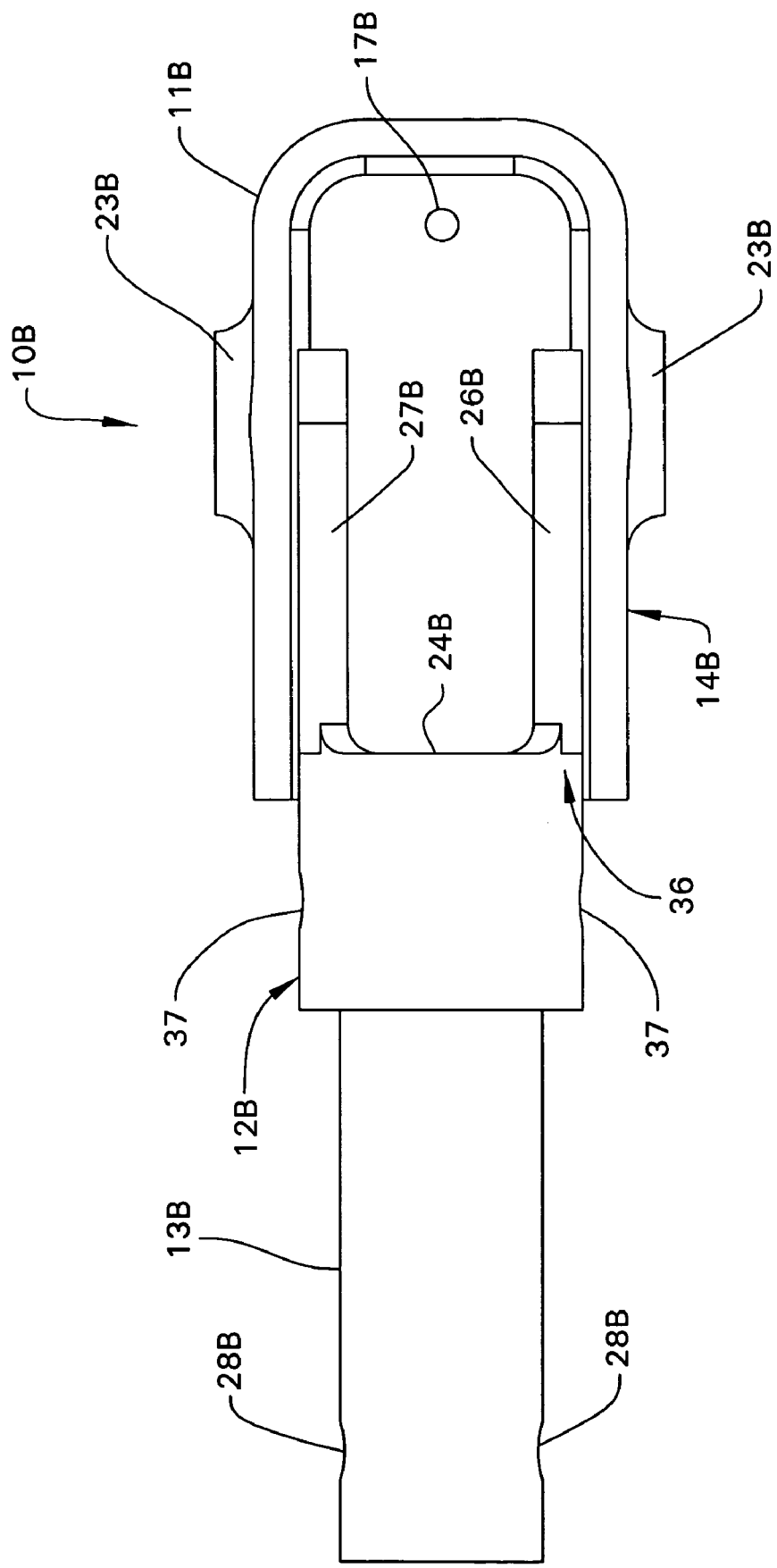
FIG. 11 is a bottom view of FIGS. 9 and 10.

FIGS. 9-11 illustrate a third embodiment of a dock fender support bracket 10B. The reference numerals that will be used to describe the third embodiment 10B will be the same ones that have been utilized above except that the suffix "B" has been added thereto. Details of many of these components will not be described again as such would be deemed to be surpluses.

Figure 14:
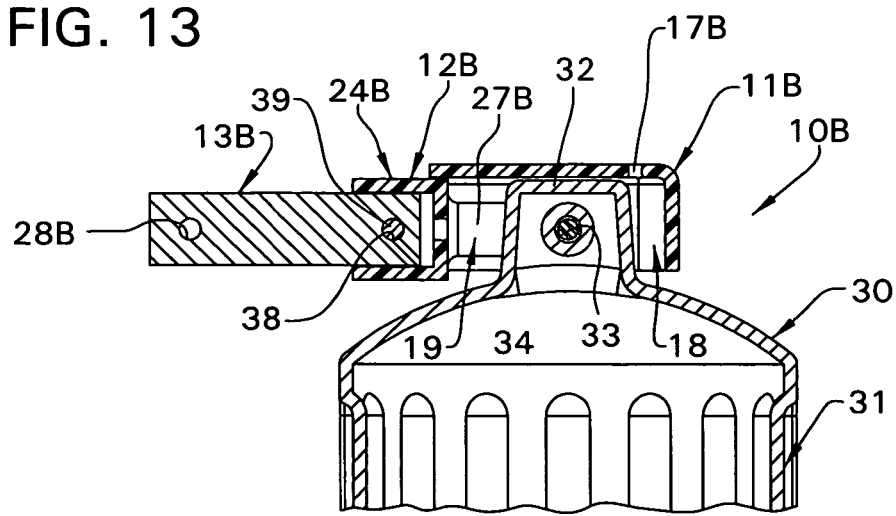
FIG. 14 is a sectional view of the embodiment illustrated in FIGS. 9-11 and corresponding to a section lines 5-5 illustrated in FIG. 3.

The third embodiment of the dock fender support bracket 10B is similar in many respects to the second embodiment 10A. The primary distinction is that the cup shaped holder section 11B, the clevis section 12B and the elongate rod section 13B are separate components from one another and are each made respectively of the same synthetic resin material, namely, a rubber having a Durometer hardness value ranging between a Shore A of 90 and a Shore D of 60. In this particular embodiment, the body part 24B of the clevis section 12B is of a hollow cylindrical shape having at one end thereof the parallel flanges 26B and 27B extending away therefrom as illustrated in FIG. 11. Furthermore, the cylindrical body part 24B includes axially aligned holes 37 extending through the wall of the body part 24B. The elongate rod section 13B is illustrated as being of a solid cross section (FIG. 14) with one end thereof adapted to be received into the hollow interior of the body part 24B. The end of the elongate rod section 13B there is received into the hollow interior of the body part 24B has a hole 38 therethrough axially aligned with the holes 37 in the body part 24 so that a fastener 39 can be received therethrough to facilitate a connection of the clevis section 12B to the elongate rod section 13B.

If desired, the clevis section 12B could be made of a metal, such as a non-rusting aluminum or stainless steel. The cup shaped holder section 11 would effectively cover the metal componentry to prevent contact thereof with the hull surface of a boat. Further, the elongate rod section 13B could be made hollow.

Figure 12:
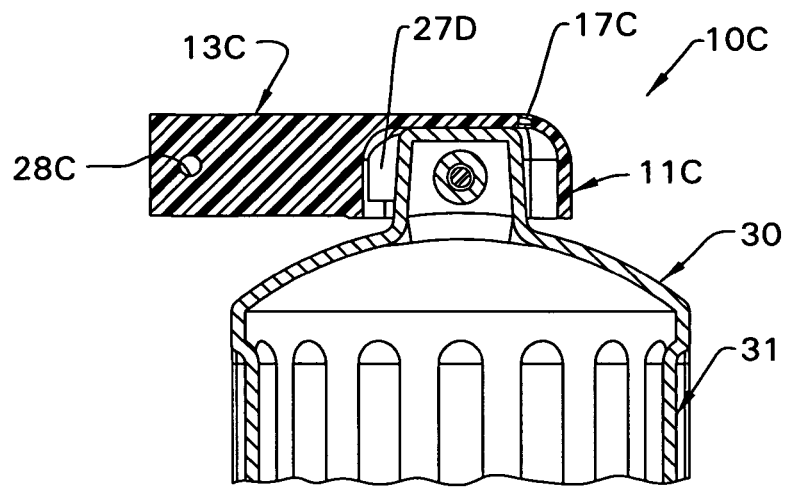
FIG. 12 is a sectional view of a further embodiment of the dock fender support bracket taken along a line corresponding to the line 5-5 illustrated in FIG. 3.

The dock fender support bracket 10C illustrated in FIG. 12 is closely related to the dock fender support bracket 10 illustrated in FIGS. 1-5. The only difference between the two embodiments is that the elongate rod section 13C is solid whereas the elongate rod section 13 in FIGS. 1-5 is hollow.

Figure 13:
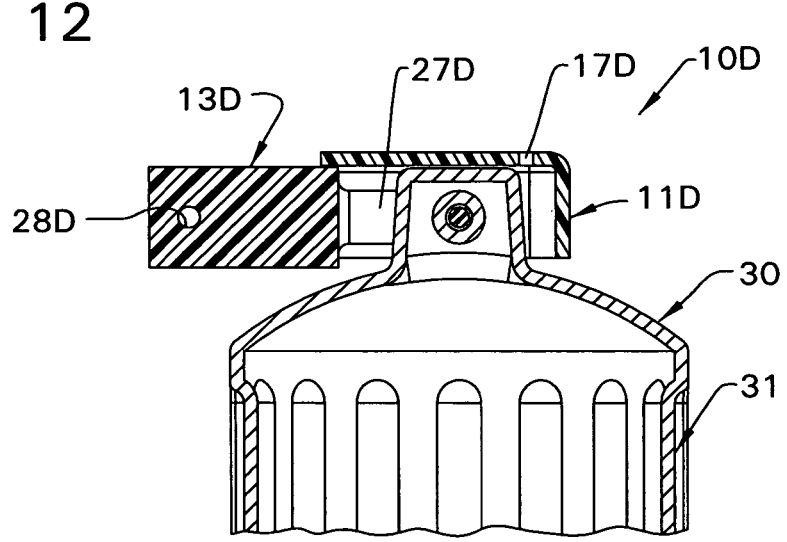
FIG. 13 is a sectional view of a still further embodiment of the dock fender support bracket embodying the invention and corresponding to a section line 5-5 in FIG. 3.

The dock fender support bracket 10D illustrated in FIG. 13 is similar to the dock fender support bracket 10A illustrated in FIGS. 6-8. The only difference between the two embodiments is that the elongate rod section 13D is solid whereas the elongate rod section 13A is hollow.

Figure 15:
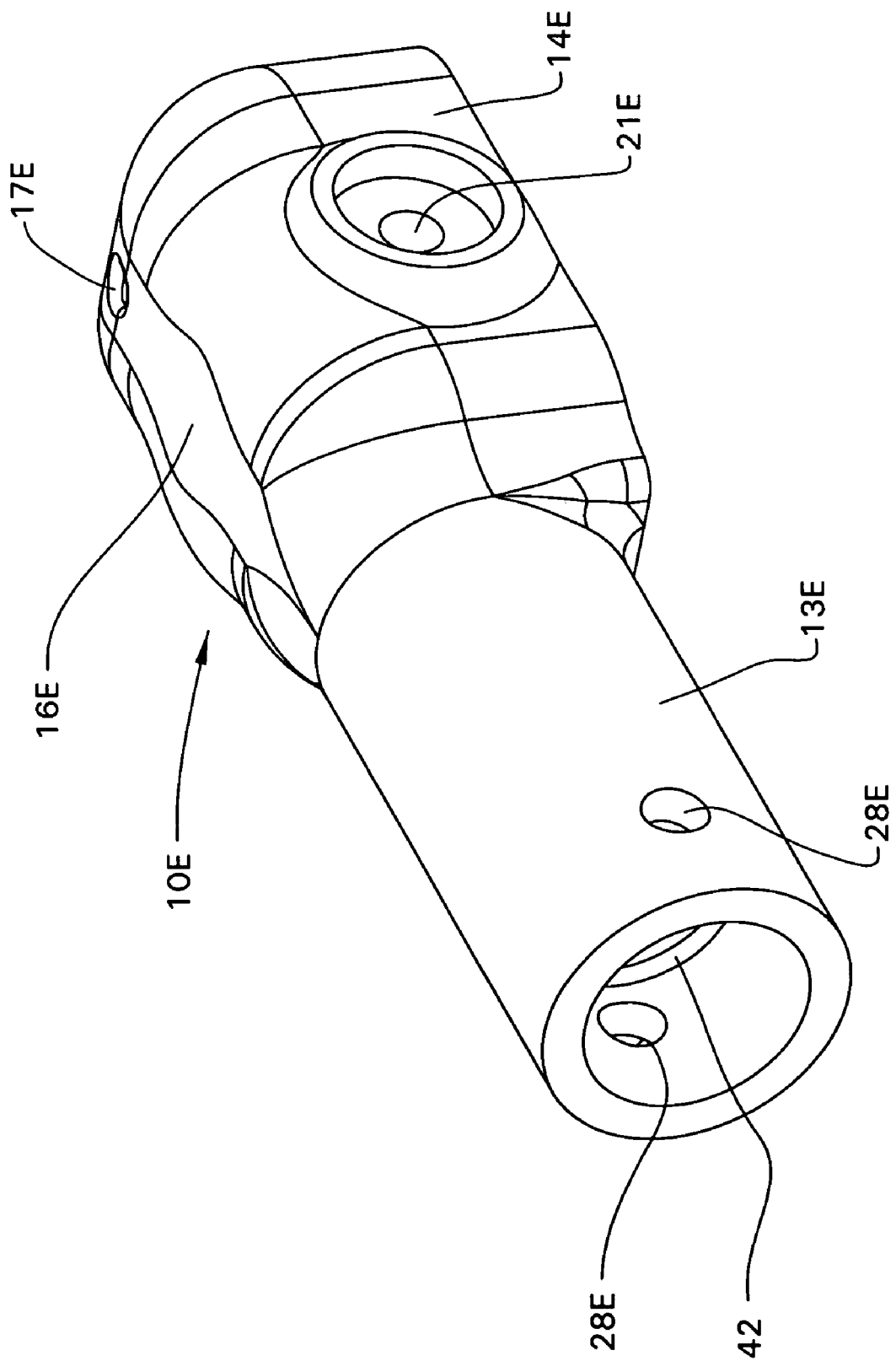
FIG. 15 is a perspective view of a further embodiment of a dock fender support according to the invention.
Figure 16:
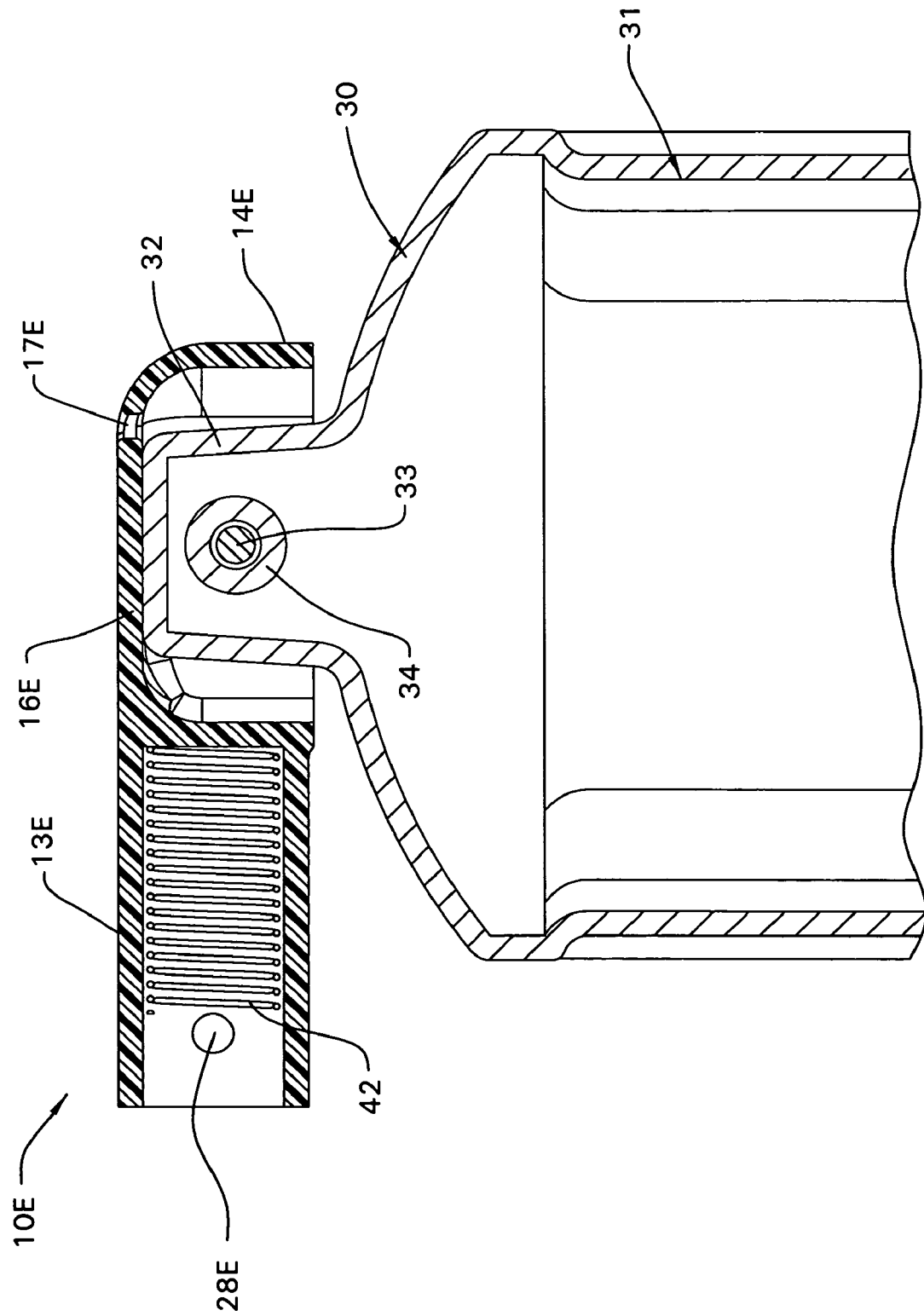
FIG. 16 is a sectional view of the dock fender support of FIG. 15.

A further configuration of the dock fender support bracket 10E is illustrated in FIGS. 15-16, and is similar to the bracket 10 of FIGS. 1-5. The bracket 10E of FIGS. 15-16 includes a hollow elongate rod section 13E that is combined with or integrally molded with a spring 42. When combined with the hollow elongate rod section 13E, the spring 42 closely conforms to the internal surface of the hollow elongate rod section 13E, thereby reinforcing the resin of the hollow elongate rod 13E. When integrally molded with the rod section 13E, the spring 42 also reinforces the rod section 13E. In either configuration, the spring 42 reinforces the rod section 13E by increasing stiffness of the rod section 13E, and the bending moment the assembly can withstand, without unduly reducing its resilience.

Figure 17:
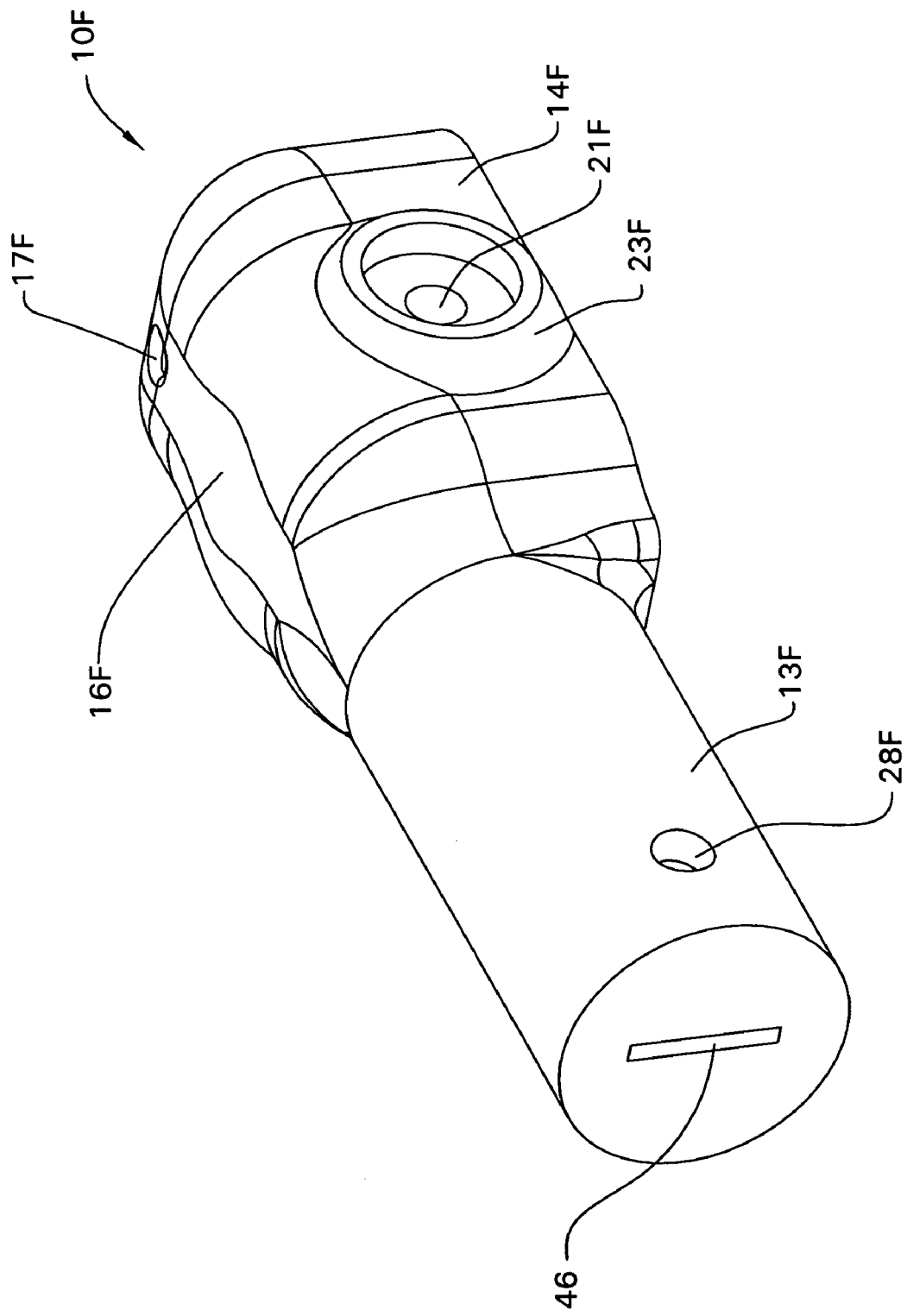
FIG. 17 is a perspective view of a further embodiment of a dock fender support according to the invention.
Figure 18:
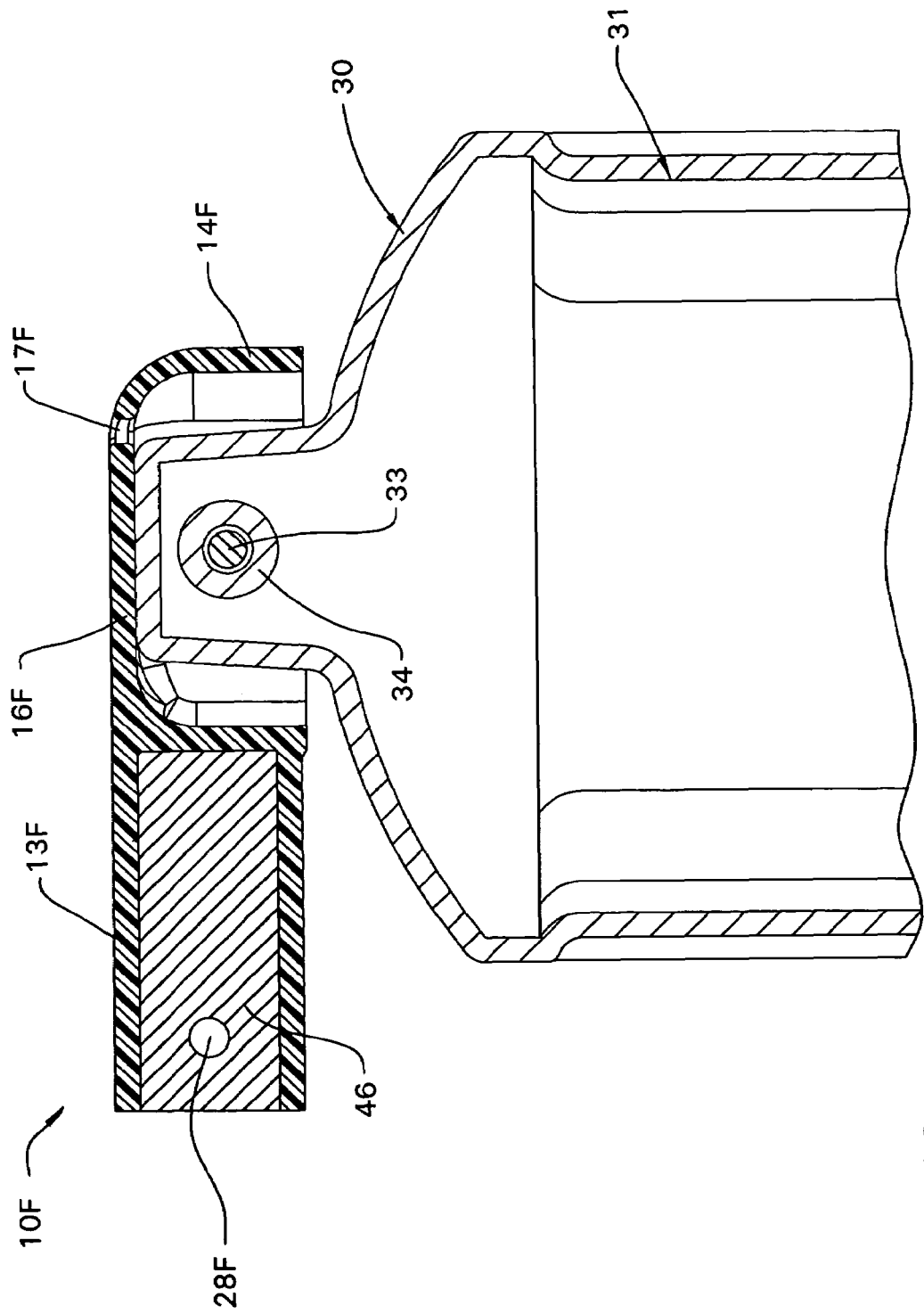
FIG. 18 is a sectional view of the dock fender support of FIG. 17.
Figure 19:
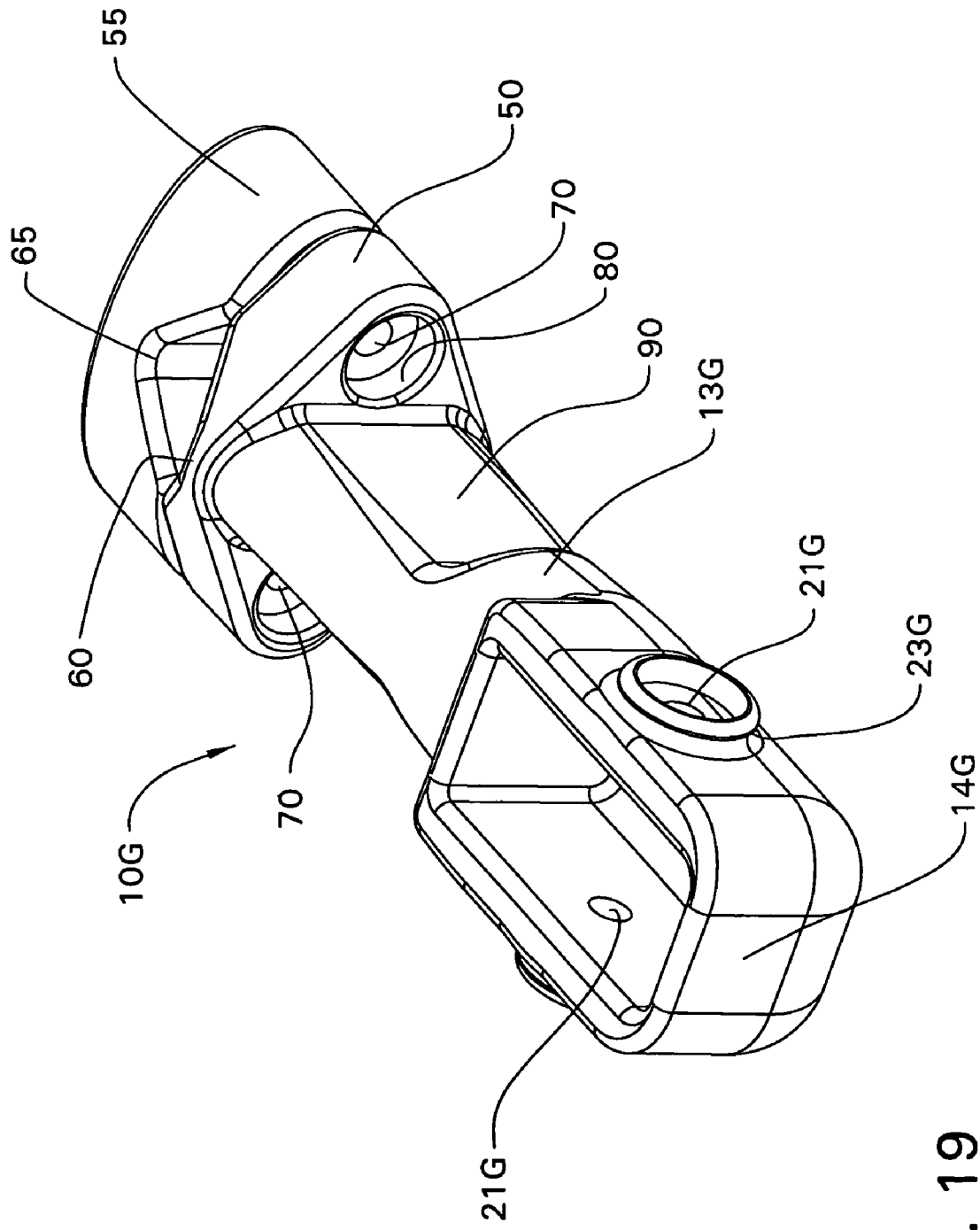
FIG. 19 is a perspective view of a further embodiment of a dock fender support according to the invention.
Figure 20:
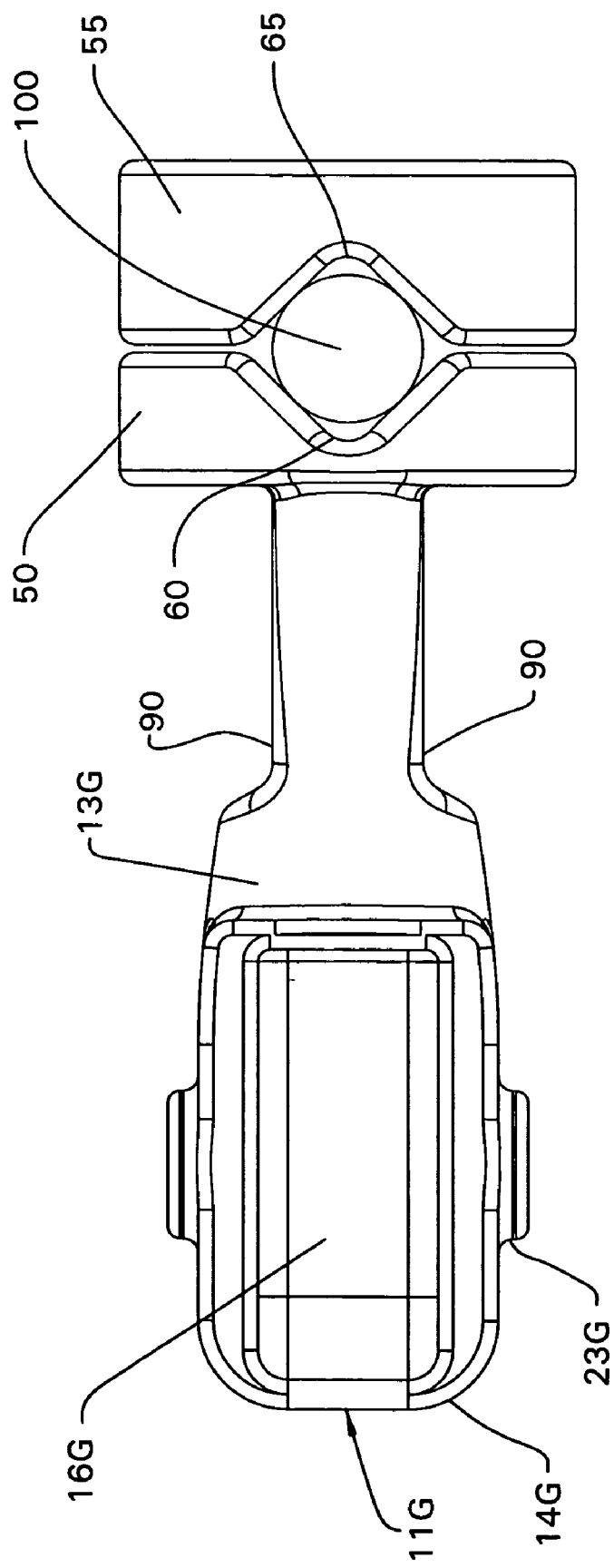
FIG. 20 is a top view of the dock fender support of FIG. 19.
Figure 21:
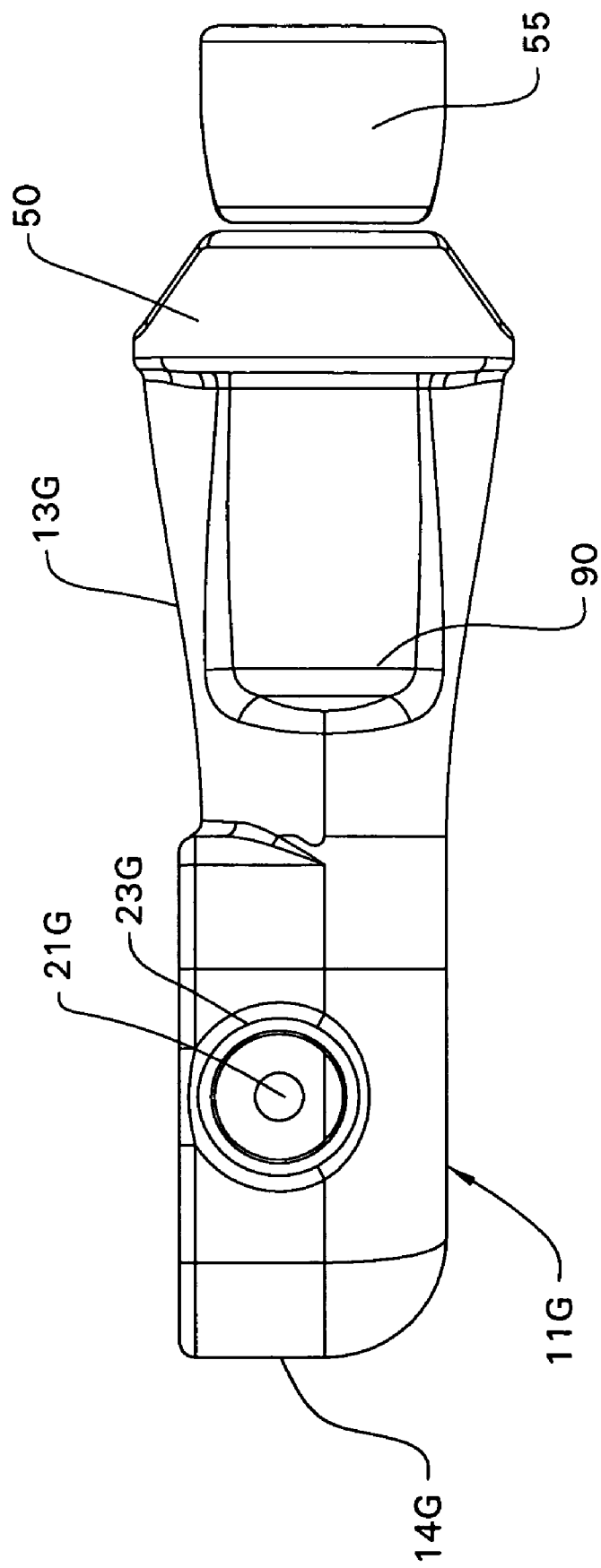
FIG. 21 is a side view of the dock fender support of FIGS. 19-20.

A further configuration of the dock fender support bracket 10F is illustrated in FIGS. 17-18, and is similar to the bracket 10C of FIG. 12. The bracket 10F of FIGS. 17-18 includes a substantially solid elongate rod section 13F. The elongate rod section 13F is provided with a section of flat metallic stock 46, preferably stainless steel, that is integrally molded within the elongate rod section 13F. In the alternative, the elongate rod section can be molded with a central void and the flat metallic stock 46 can be inserted after molding. The stock 46 reinforces the resin of the hollow elongate rod 13F by increasing the stiffness of the elongate rod 13F and the bending moment the assembly can withstand, without unduly reducing its resilience.

Referring now to FIGS. 19-23, a dock fender support bracket 10G includes an integrated mounting plate 50 for attaching the bracket 10G directly to a vertical support member 100, 110. The mounting plate 50 cooperates with a backing plate 55 to secure the bracket 10G to the vertical support member 100, 110.

Each of the mounting plate 50 and the backing plate 55 include aligned central depressions 60, 65. The mounting plate 50 and the backing plate 55 are configured to be connected by a pair of fasteners (not shown) such as nut and bolt combinations extending through apertures 70, 75 in the mounting plate 50 and backing plate 55 respectively. The plates 50, 55 also include a recess 80, 85 about each aperture 70, 75 for receiving in a recessed fashion the heads of the respective fasteners.

The dock fender support bracket 10G includes an elongate rod section 13G connecting the mounting plate 50 and a cup-like holder section 11G. The rod section 13G includes a pair of cut-out regions 90 for permitting access of a wrench or other tool when securing the fasteners in the apertures 70.

Figure 22:
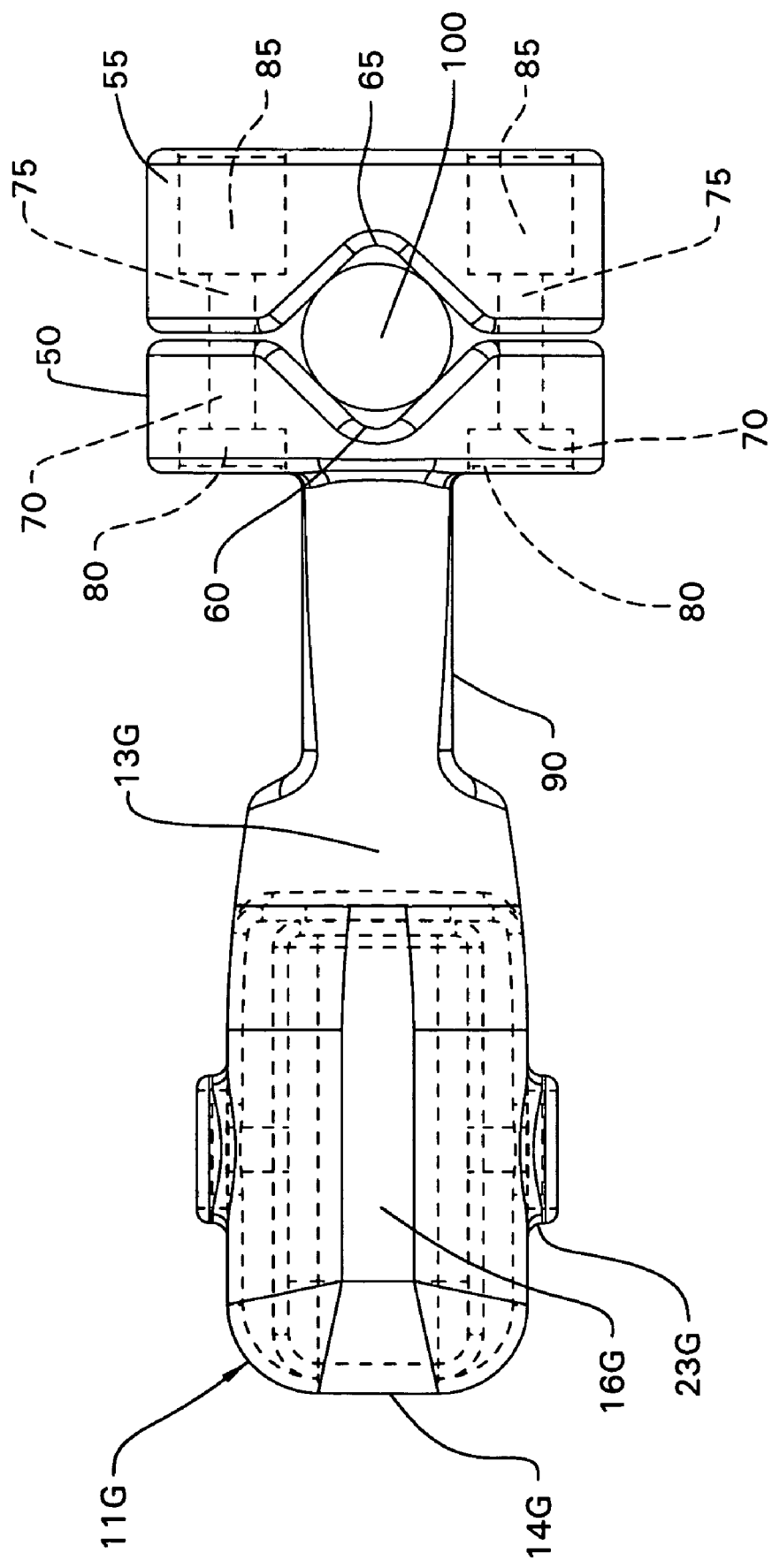
FIG. 22 is a bottom view of the dock fender support of FIGS. 19-21.
Figure 23:
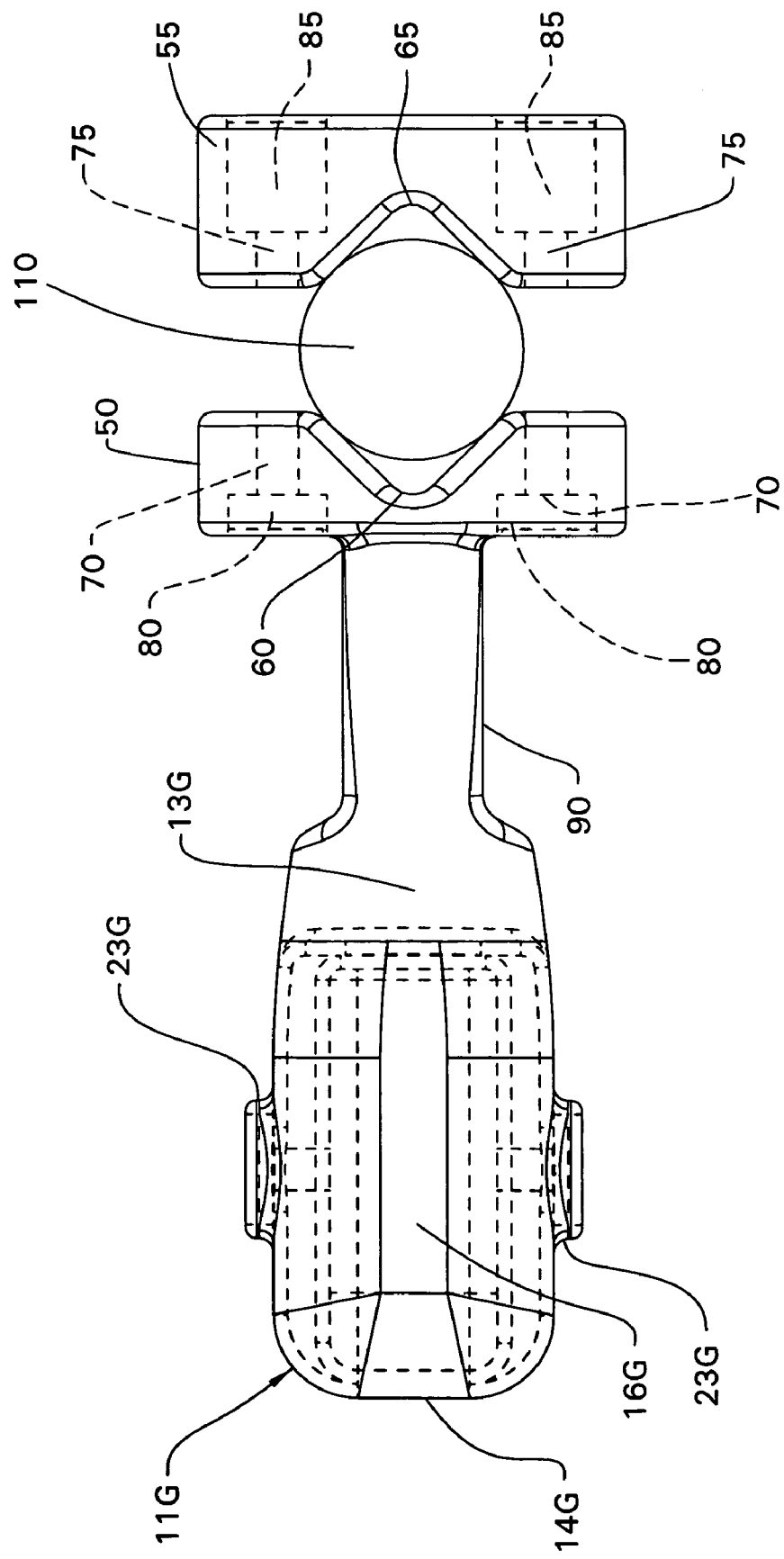
FIG. 23 is a bottom view of the dock fender support of FIGS. 19-22 arranged for mounting on a larger diameter support.
Figure 24:
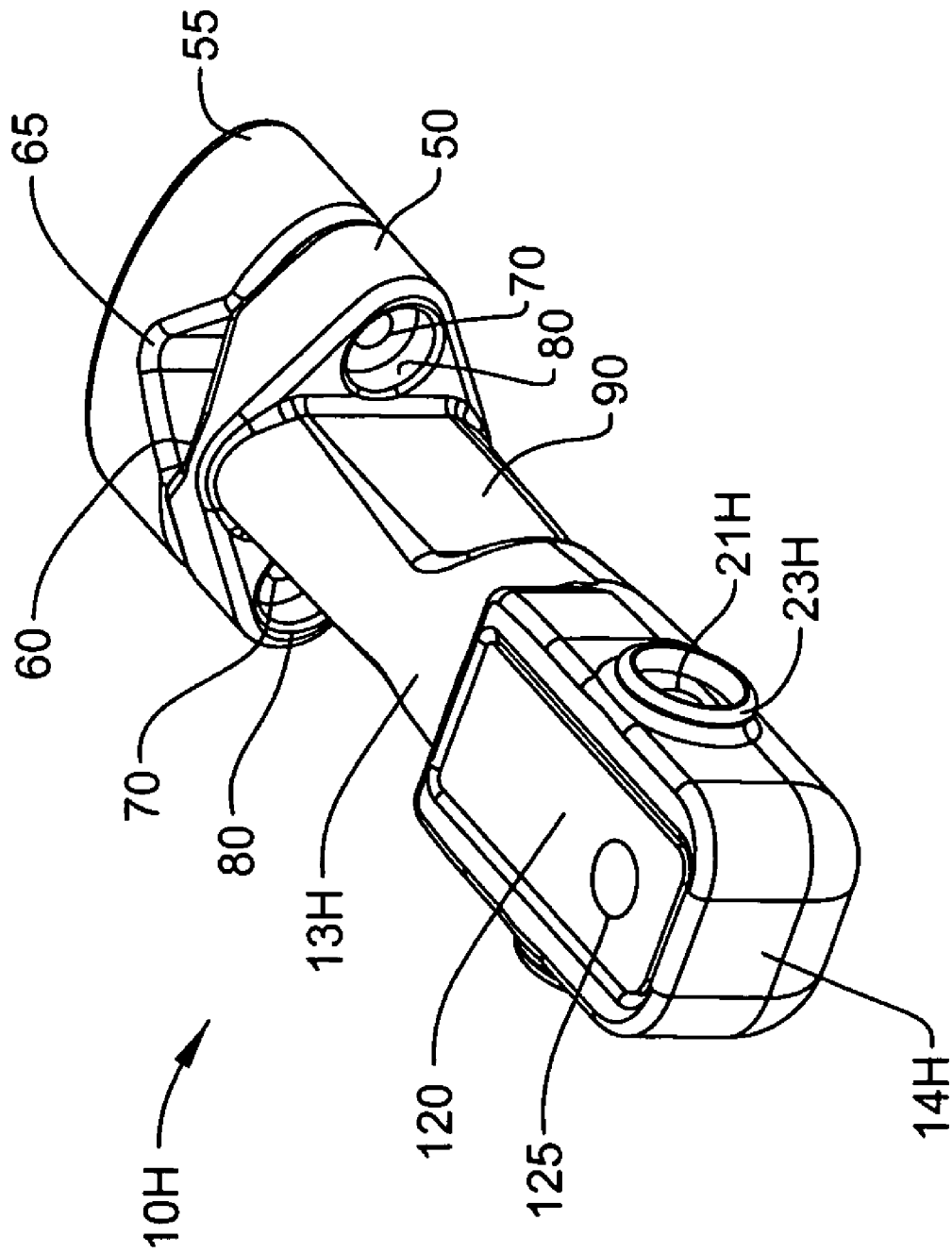
FIG. 24 is a perspective view of a further embodiment of a dock fender support according to the invention.
Figure 27:
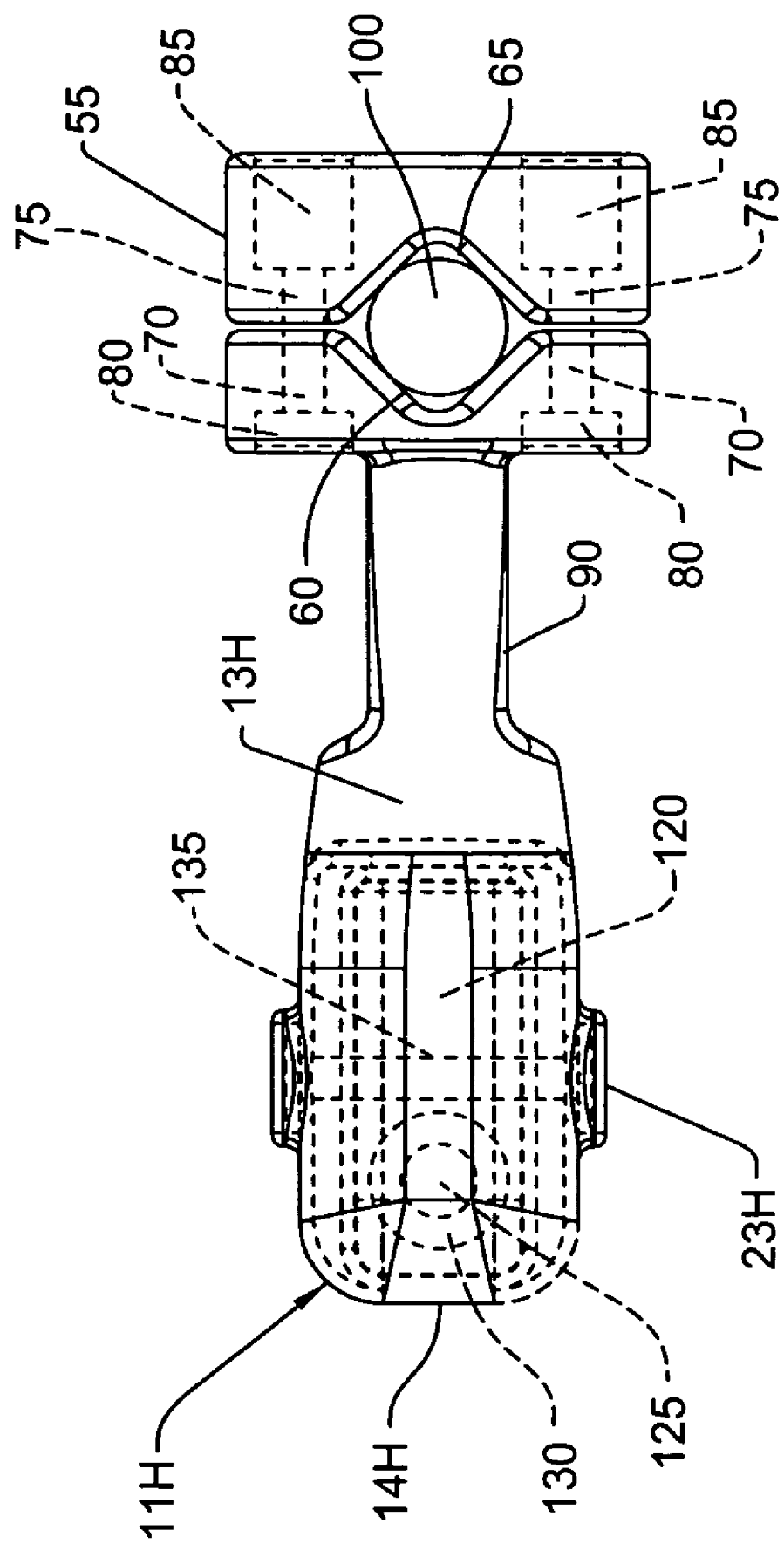
FIG. 27 is a bottom view of the dock fender support of FIGS. 24-26.

As can be observed by comparing FIGS. 22 and 23, the dock fender support bracket 10G is capable of mounting on vertical support members 100, 110 of different dimensions and cross-sections. By carefully selecting the length of the fasteners, the fasteners will remain within the recesses 80, 85 when the bracket 10G is secured to the vertical support member 100, 110.

A further embodiment of a dock fender support bracket 10H is depicted in FIGS. 24-27. The support bracket 10H is depicted as being equivalent in construction to the support bracket of 10G in FIGS. 19-23 including the integrated mounting plate 50 for attaching the bracket 10H to a vertical support member 100. The mounting plate 50 cooperates with a backing plate 55 to secure the brackets 10H to the vertical support member 100.

Each of the mounting plate 50 and the backing plate 55 include aligned central depressions 60, 65. The mounting plate 50 and the backing plate 55 are configured to be connected by a pair of fasteners (not shown) such as nut and bolt combinations extending through apertures 70, 75 in the mounting plate 50 and backing plate 55 respectively. The plates 50, 55 also include recesses 80, 85 about each aperture 70, 75 for receiving in a recessed fashion the heads of the respective fasteners.

The dock fender support bracket 10H includes an elongate rod section 13H connecting the mounting plate 50 and a cup-like holder section 11H. The rod section 13H includes a pair of cut-out regions 90 for permitting access of a wrench or other tool when securing the fasteners in the apertures 70.

The dock fender support bracket 10H of FIGS. 24-27 further includes a molded resilient insert 120 removably mounted in the cup-like holder section 11H of the support bracket 10H. The insert 120 includes an aperture 125 for receiving a threaded rod 32H mounting a dock fender 30H.

The dock fender 30H is an air-filled bladder having a longitudinal passage (not shown). The fender 30H is rotatably mounted on the threaded rod 32H in order to prevent the transmission of a rotational torque from the dock fender 30H to the dock fender support bracket 10H. The dock fender 30H rotates on the threaded rod 32H as a boat rides along the surface of the fender 30H. The threaded rod 32H is formed of a resilient glass-filled resin, which is capable of bending with the impact of a boat against the dock fender 30H without breaking or kinking, and returning to its original straight configuration.

The threaded rod 32H is secured to the insert 120 by a nut 33H. The nut 33H is carried within a recess 130 of the insert 120. The dock fender 30H is secured to the insert 120 prior to insertion of the insert 120 into the support bracket 10H. The insert 120 is then secured within the support bracket 10H by a fastener (not shown) passing through holes 21H in the support bracket 10H and a transverse passage 135 through the insert 120.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A dock fender support bracket configured to couple to a flange of a dock fender having a first hole therethrough, comprising:

a cup-like holder section having a sidewall and a bottom wall and a pair of axially aligned second holes through said sidewall;

a clevis section having a body with spaced flanges oriented inside said cup-like holder section and extending in parallel planes, and a third hole through each of said spaced flanges coaxially aligned with said second holes;

an elongate rod section joined to at least said body of said clevis, said elongate rod being configured to be attached to a dock at an end remote from said body and additionally configured to elastically flex in all directions transverse of a longitudinal axis thereof when said end is attached to the dock; and said clevis section being configured to receive the flange of the dock fender between said spaced flanges so that an axis of the first hole becomes generally coaxially aligned with said coaxial second and third holes, said second and third holes being configured to receive a fastener therethrough as well as facilitated through the first hole to effect coupling of the dock fender to said dock fender support bracket.

2. The dock fender support bracket according to claim 1, wherein said cup-holder section, said clevis section and said elongate rod section are separate components.

3. The dock fender support bracket according to claim 2, wherein said clevis section is made of metal and said elongate rod section and said cuplike holder section are made of a synthetic resin material.

4. The dock fender support bracket according to claim 3, wherein said synthetic resin material is a rubber having a durometer between a Shore A of 90 and a Shore D of 60.

5. The dock fender support bracket according to claim 1, wherein said clevis section and said elongate rod section form a unitary construction.

6. The dock fender support bracket according to claim 1, wherein said cup-like holder section, said clevis section and said elongate rod section form a unitary construction.

7. The dock fender support bracket according to claim 6, wherein said unitary construction is made of a synthetic resin material.

8. The dock fender support bracket according to claim 7, wherein said synthetic resin material is a rubber having a durometer between a Shore A of 90 and a Shore D of 60.

9. The dock fender support bracket according to claim 1, wherein said elongate rod section is solid throughout a length thereof.

10. The dock fender support bracket according to claim 9, further comprising a reinforcing bar inserted lengthwise within said elongate rod section.

11. The dock fender support bracket according to claim 1, said elongate rod section further comprising a hollow cylindrical portion.

12. The dock fender support bracket according to claim 11, where said elongate rod section is hollow throughout a length thereof.

13. The dock fender support bracket according to claim 11, further comprising a spring inserted within said hollow cylindrical portion.

14. The dock fender support bracket according to claim 1, wherein said elongate rod section is made of a synthetic resin material.

15. The dock fender support bracket according to claim 14, wherein said synthetic resin material is a rubber having a durometer between a Shore A of 90 and a Shore D of 60.

16. The dock fender support bracket according to claim 9, wherein said synthetic resin material is a rubber having a durometer between a Shore A of 90 and a Shore D of 60.

17. A dock fender support comprising:
a cup shaped holder section having a sidewall and a bottom wall defining a cupped cavity and a pair of apertures through said sidewall;
an elongate section joined at a first end to said cup shaped holder section, said elongate section being configured to be attached at a second end to a dock, and additionally configured to elastically flex in all directions transverse of a longitudinal axis thereof when said second end is attached to the dock;
a mounting bracket configured to attach said elongate section to the dock; and
an insert mounted within the cavity of the cup shaped holder section, the insert including an aperture for receiving a dock fender support rod.

18. The dock fender support according to claim 17, wherein said cup shaped holder, said elongate section and said mounting bracket are integrally formed of a resin having a durometer between a Shore A of 90 and a Shore D of 60.

19. The dock fender support according to claim 17, wherein the apertures through said sidewall are aligned and the insert further comprises a transverse aperture for receiving a fastener to secure the insert within the cavity of the cup shaped holder section, the transverse aperture being aligned with the aligned apertures through said sidewall.

20. In combination, a dock fender and support bracket for mounting the dock fender to a dock, comprising:
a dock fender having a support rod extending therefrom; and
a support bracket comprising:
a cup-like holder section having a sidewall and a bottom wall and a pair of aligned apertures through said sidewall;
an insert mounted within said cup-like holder section, said insert including an aperture receiving said support rod, and a transverse aperture aligned with said aligned apertures through said sidewall;
a fastener passing through said pair of aligned apertures and said transverse aperture to secure said insert within said cup-like holder;
an elongate section joined at a first end to said cup-like holder section, said elongate section being configured to be attached at a second end to a dock, and additionally configured to elastically flex in all directions transverse of a longitudinal axis thereof; and
a mounting bracket configured to attach said elongate section to the dock, the mounting bracket comprising a mounting plate integrally molded with the elongate section and a backing plate secured to the mounting plate by at least one fastener, the mounting plate and the backing plate configured to capture a dock member therebetween for mounting the support bracket to a dock.

21. The combination according to claim 20, wherein said dock fender is rotatably mounted on said support rod.

22. The combination according to claim 20, wherein said support rod is formed of a glass-filled resin.

23. The combination according to claim 20, said dock fender further comprising an airfilled bladder.

24. The combination according to claim 20, wherein said support rod extends through said dock fender.

* * * * *